(12) United States Patent
Han et al.

(10) Patent No.: US 12,228,469 B2
(45) Date of Patent: Feb. 18, 2025

(54) METHOD OF MEASURING EXTERNAL PRESSURE USING CAPACITIVE PRESSURE SENSORS

(71) Applicants: Hyundai Motor Company, Seoul (KR); Kia Corporation, Seoul (KR)

(72) Inventors: Hyo Seung Han, Suwon-si (KR); Suk Hyung Jang, Siheung-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/337,646

(22) Filed: Jun. 20, 2023

(65) Prior Publication Data

US 2023/0332970 A1 Oct. 19, 2023

Related U.S. Application Data

(62) Division of application No. 17/592,844, filed on Feb. 4, 2022, now Pat. No. 11,719,588, which is a division of application No. 16/687,970, filed on Nov. 19, 2019, now Pat. No. 11,274,985.

(30) Foreign Application Priority Data

Jul. 12, 2019 (KR) .................. 10-2019-0084531

(51) Int. Cl.
G01L 9/00 (2006.01)
G01L 7/08 (2006.01)
G01L 9/12 (2006.01)

(52) U.S. Cl.
CPC .............. *G01L 9/0073* (2013.01); *G01L 7/08* (2013.01); *G01L 9/0005* (2013.01); *G01L 9/12* (2013.01)

(58) Field of Classification Search
None
See application file for complete search history.

(56) References Cited

U.S. PATENT DOCUMENTS

| | | | | |
|---|---|---|---|---|
| 6,314,823 | B1 * | 11/2001 | Okada | G01P 15/105 |
| | | | | 73/862.043 |
| 10,139,975 | B2 * | 11/2018 | Shutzberg | G06F 1/1656 |
| 10,747,374 | B2 | 8/2020 | Lee et al. | |
| 2011/0175703 | A1 * | 7/2011 | Benkley, III | G06V 40/1329 |
| | | | | 340/5.82 |
| 2011/0290038 | A1 * | 12/2011 | Hoshino | G06F 3/041 |
| | | | | 73/862.627 |

(Continued)

FOREIGN PATENT DOCUMENTS

JP 2010071870 A 4/2010
KR 20150018463 A 2/2015

*Primary Examiner* — Suman K Nath
*Assistant Examiner* — Nigel H Plumb
(74) *Attorney, Agent, or Firm* — SLATER MATSIL, LLP

(57) ABSTRACT

A capacitive pressure sensor includes a first electrode and a second electrode disposed on a surface of a folded flexible substrate. The first and second electrodes face each other and are separated from each other by a dielectric layer. The sensor can operate by generating an electrical signal related to a change in capacitance between the first and second electrodes. The change in capacitance results from a change in thickness of the dielectric layer due to an external pressure. The electrical signal can be transmitted from the capacitive pressure sensor to an external device.

20 Claims, 7 Drawing Sheets

(56) References Cited

U.S. PATENT DOCUMENTS

| | | | |
|---|---|---|---|
| 2014/0174189 A1* | 6/2014 | Pan | G01L 9/0072 |
| | | | 73/724 |
| 2015/0018463 A1* | 1/2015 | Chikhalikar | C08K 5/005 |
| | | | 524/126 |
| 2015/0040674 A1* | 2/2015 | Ishihara | G01L 19/0636 |
| | | | 73/724 |

* cited by examiner

METHOD OF MEASURING EXTERNAL PRESSURE USING CAPACITIVE PRESSURE SENSORS

CROSS-REFERENCE TO RELATED APPLICATIONS

This application is a divisional application of U.S. patent application Ser. No. 17/592,844, filed on Feb. 4, 2022, which is a divisional application of U.S. patent application Ser. No. 16/687,970, filed on Nov. 19, 2019, now U.S. Pat. No. 11,274,985, which issued on Mar. 15, 2022, which claims priority to Korean Patent Application No. 10-2019-0084531, filed on Jul. 12, 2019, which applications are hereby incorporated herein by reference.

TECHNICAL FIELD

The present disclosure relates to a capacitive pressure sensor, a manufacturing method thereof, and a capacitive pressure sensor device.

BACKGROUND

In general, a pressure sensor is an energy converter that converts mechanical energy into electrical energy and is used to measure absolute pressure or gauge pressure. Various types of pressure sensors such as a strain gauge type metal pressure sensor, a piezoresistive pressure sensor, a piezoelectric pressure sensor, a MOSFET type, a piezo junction type, an optical fiber pressure sensor, and a capacitive pressure sensor are proposed and used according to the principle of sensing pressure.

Among them, the capacitive pressure sensor may mainly form a plate capacitor between a diaphragm (membrane) and a support, and may recognize the pressure by changing a capacitance value caused by a deflection of the diaphragm according to the externally applied pressure, that is, a change of a gap between the two electrodes due to a deformation of the membrane.

Meanwhile, the conventional capacitive pressure sensor requires a complex structure and multiple layers to form a capacitor having a pair of electrodes facing each other. Further, the capacitive pressure sensor and a signal processing unit for processing signals sensed from the capacitive pressure sensor were configured as separate components, and therefore, the capacitive pressure sensor and the signal processing unit which are heterogeneous had to be connected through a connector. As a result, problems such as instability of a sensor signal and data loss may occur.

SUMMARY

The present disclosure relates to a capacitive pressure sensor, a manufacturing method thereof, and a capacitive pressure sensor device. Particular embodiments relate to a capacitive pressure sensor, a manufacturing method thereof, and a capacitive pressure sensor device in which stability of a sensor signal is improved by integrating the capacitive pressure sensor and a signal processing unit.

Embodiments of the present disclosure provide a capacitive pressure sensor, a manufacturing method thereof, and a capacitive pressure sensor device capable of solving problems such as instability of a sensor signal and data loss conventionally caused by coupling heterogeneous components by disposing a first electrode, a second electrode, and a signal processing unit on the same surface of a flexible substrate and forming a printed circuit pattern on the corresponding surface to electrically connect the respective component to each other, thereby integrating the capacitive pressure sensor and the signal processing unit of processing a signal sensed by the capacitive pressure sensor.

According to an embodiment of the present disclosure, a capacitive pressure sensor includes a flexible substrate, a first electrode and a second electrode disposed on one surface of the flexible substrate so as to be spaced apart from each other and located to face each other when the flexible substrate is folded, a dielectric layer interposed between the first electrode and the second electrode, and a signal processing unit disposed on one surface of the flexible substrate and converting a capacitance, which changes as a thickness of the dielectric layer changes by external pressure in a state in which the flexible substrate is folded, into an electrical signal.

A pattern is formed at a portion of the flexible substrate between the first electrode and the second electrode so that the flexible substrate may be foldable.

The capacitive pressure sensor may further include a communication unit disposed on one surface of the flexible substrate and electrically connected to the signal processing unit to transmit the signal converted by the signal processing unit to an external device.

A stainless steel substrate may be attached onto a bottom surface of the flexible substrate on which the signal processing unit is disposed and support a portion of the flexible substrate onto which the stainless steel substrate is attached.

The flexible substrate may be coated with a film except for portions on which the first electrode and the second electrode are disposed.

According to another embodiment of the present disclosure, a capacitive pressure sensor device includes a plurality of capacitive pressure sensors, wherein the plurality of capacitive pressure sensors is connected in parallel to each other.

The capacitive pressure sensor device may further include a signal integrating unit for integrating signals transmitted from each signal processing unit of the plurality of capacitive pressure sensors connected in parallel to each other.

According to still another embodiment of the present disclosure, a capacitive pressure sensor includes: a plurality of flexible substrates; a plurality of first electrodes and second electrodes disposed on one surface of each of the flexible substrates to be spaced apart from each other and located to face each other when the flexible substrates are folded; dielectric layers interposed between the first electrodes and the second electrodes; and a signal processing unit disposed on one surface of one of the plurality of flexible substrates and converting a capacitance, which changes as a thickness of the dielectric layer changes by external pressure in a state in which the plurality of flexible substrates are folded, into an electrical signal, wherein the plurality of first electrodes and second electrodes are connected in parallel to each other, and are connected to the signal processing unit.

According to still another embodiment of the present disclosure, a manufacturing method of a capacitive pressure sensor includes: attaching a first electrode and a second electrode onto one surface of a flexible substrate so as to be spaced apart from each other; forming a signal processing unit on one surface of the flexible substrate; interposing a dielectric layer between the first electrode and the second electrode; and folding the flexible substrate so that the first electrode and the second electrode face each other.

The manufacturing method may further include, before the folding of the flexible substrate so that the first electrode and the second electrode face each other, forming a communication unit electrically connected to the signal processing unit and transmitting a signal converted by the signal processing unit to an external device, on one surface of the flexible substrate.

The manufacturing method may further include, before the attaching of the first electrode and the second electrode onto one surface of the flexible substrate so as to be spaced apart from each other, forming a hatch pattern between the portions of the flexible substrate on which the first electrode and the second electrode are disposed; and attaching a stainless steel substrate on a bottom surface of the flexible substrate on which the signal processing unit is disposed.

DETAILED DESCRIPTION OF ILLUSTRATIVE EMBODIMENTS

Hereinafter, the present disclosure will be described in detail with reference to the drawings. Terms and words used in the present specification and claims are not to be construed as a general or dictionary meaning but are to be construed as meaning and concepts meeting the technical ideas of the present disclosure based on a principle that the inventor can appropriately define the concepts of terms in order to describe their own disclosure in best mode.

Therefore, configurations described in exemplary embodiments and the accompanying drawings of the present disclosure do not represent all of the technical spirits of the present disclosure, but are merely most preferable embodiments. Therefore, the present disclosure should be construed as including all the changes, equivalents, and substitutions included in the spirit and scope of the present invention at the time of filing the application.

Figure 1:
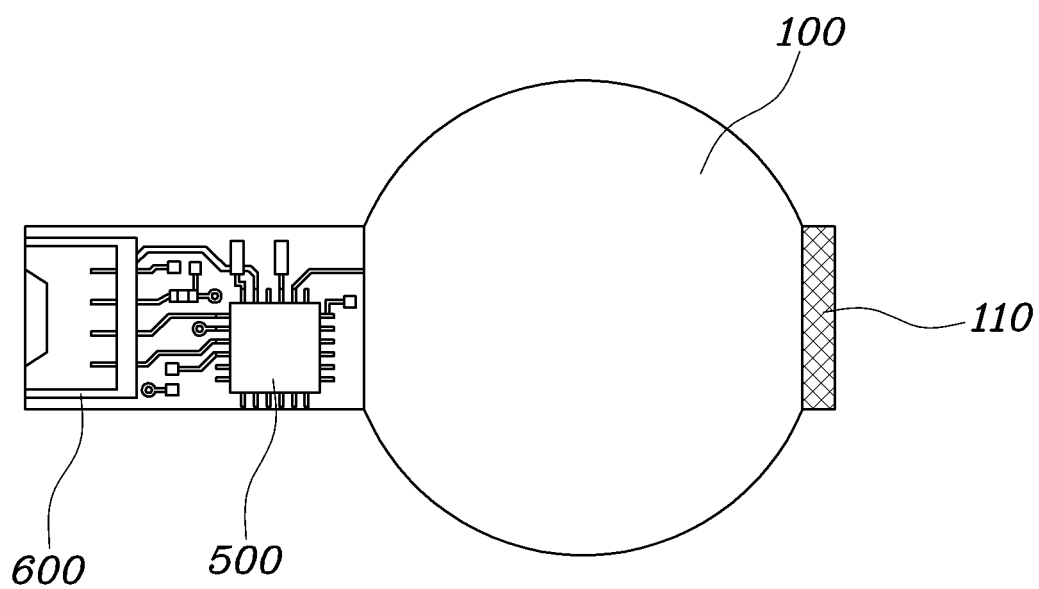
FIG. 1 is a plan view illustrating a capacitive pressure sensor according to an exemplary embodiment of the present disclosure.
Figure 2:
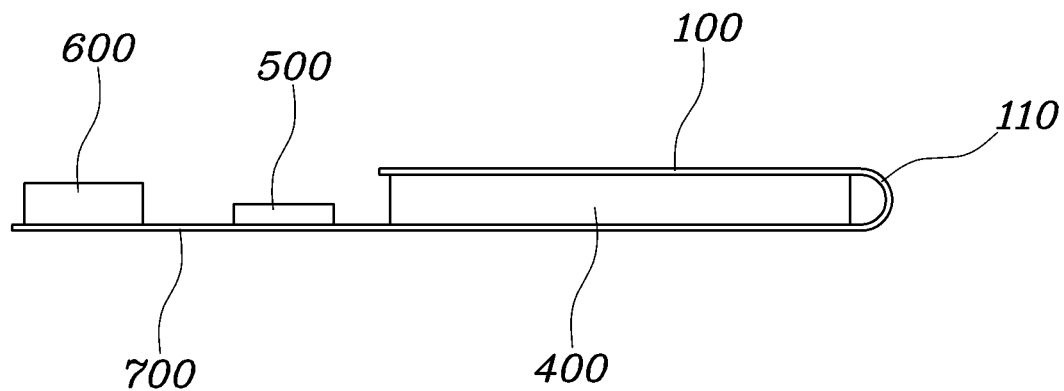
FIG. 2 is a side view illustrating the capacitive pressure sensor according to an exemplary embodiment of the present disclosure.
Figure 3:
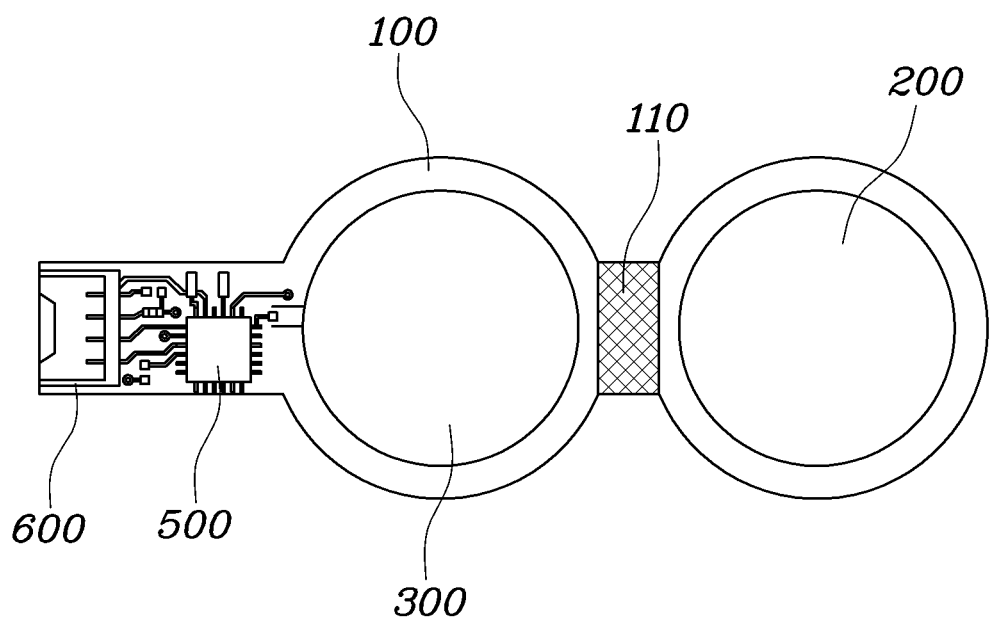
FIG. 3 is a view illustrating a top surface of the capacitive pressure sensor before a flexible substrate is folded, in the capacitive pressure sensor according to an exemplary embodiment of the present disclosure.
Figure 4:
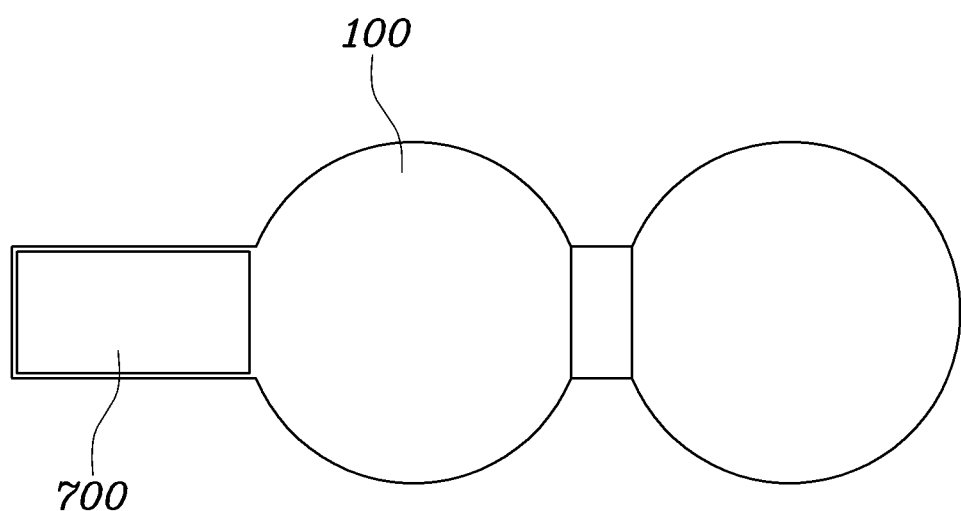
FIG. 4 is a view illustrating a bottom surface of the capacitive pressure sensor before the flexible substrate is folded, in the capacitive pressure sensor according to an exemplary embodiment of the present disclosure.
Figure 5:
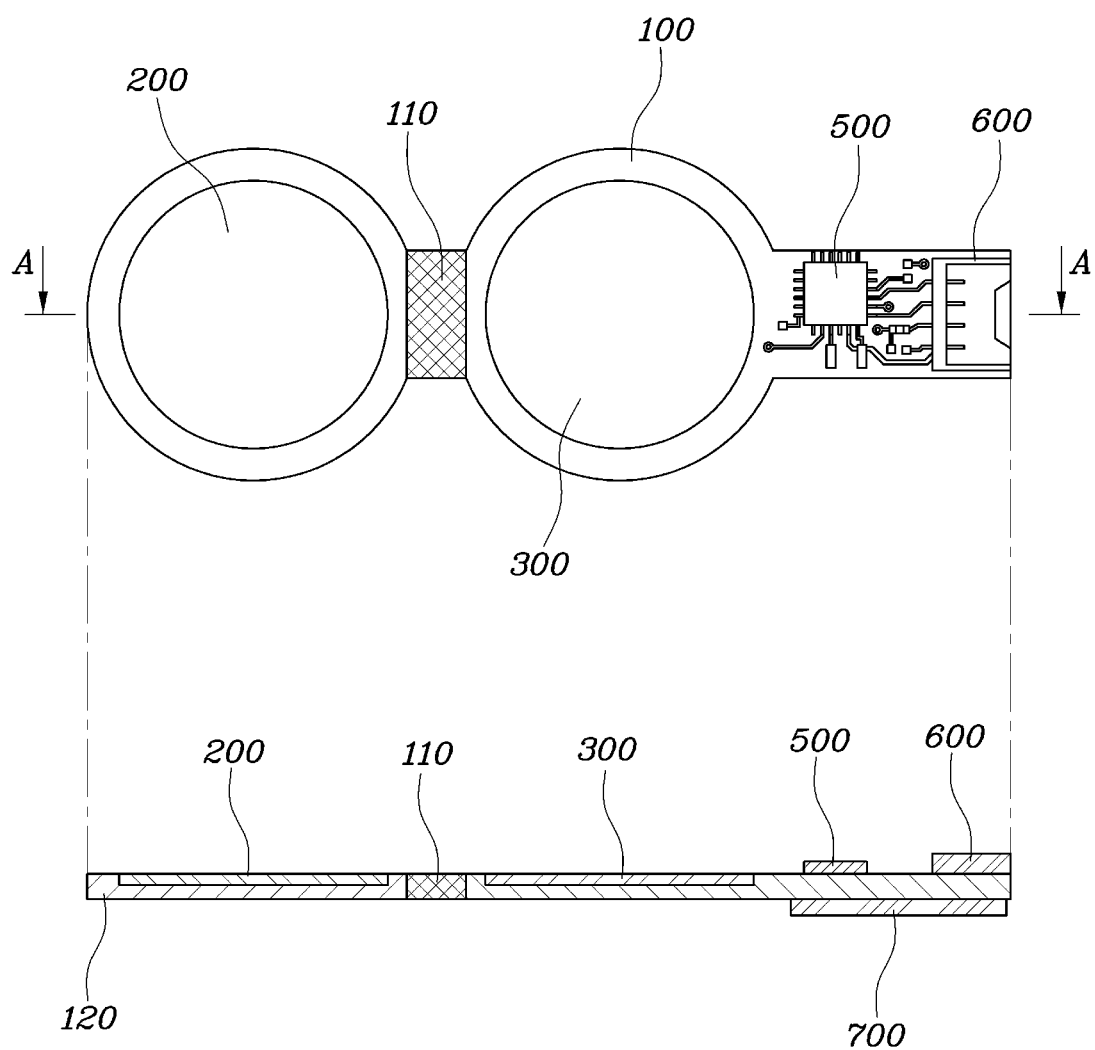
FIG. 5 is a cross-sectional view illustrating the capacitive pressure sensor according to an exemplary embodiment of the present disclosure.

FIG. 1 is a plan view illustrating a capacitive pressure sensor according to an exemplary embodiment of the present disclosure, FIG. 2 is a side view illustrating the capacitive pressure sensor according to an exemplary embodiment of the present disclosure, FIG. 3 is a view illustrating a top surface of the capacitive pressure sensor before a flexible substrate is folded, in the capacitive pressure sensor according to an exemplary embodiment of the present disclosure, FIG. 4 is a view illustrating a bottom surface of the capacitive pressure sensor before the flexible substrate is folded, in the capacitive pressure sensor according to an exemplary embodiment of the present disclosure, and FIG. 5 is a cross-sectional view illustrating the capacitive pressure sensor according to an exemplary embodiment of the present disclosure.

Referring to FIGS. 1 to 5, a capacitive pressure sensor according to an exemplary embodiment in the present disclosure may include a flexible substrate 100, a first electrode 200, a second electrode 300, a dielectric layer 400, and a signal processing unit 500, and may further include a communication unit 600.

Specifically, the flexible substrate 100 may be formed of a synthetic resin that is flexible to be foldable, and in some embodiments, the flexible substrate 100 may be a flexible printed circuit board (FPCB).

In addition, a hatch pattern 110 having a mesh form may be formed at a portion of the flexible substrate 100 between the first electrode 200 and the second electrode 300. As such, the hatch pattern no having the mesh form is formed between the first electrode 200 and the second electrode 300 of the flexible substrate 100, so that the flexible substrate 100 may be easily folded without affecting the circuit on the flexible substrate 100. As a result, the first electrode 200 and the second electrode 300 may easily face each other, and thus, the capacitive pressure sensor may be easily manufactured.

Further, the flexible substrate 100 may be coated with a film 120. According to an exemplary embodiment, the flexible substrate 100 may be coated with a film of a polyimide-based material. In this case, as illustrated in FIG. 5, the flexible substrate 100 may be coated with the film 120 except for portions on which the first electrode 200 and the second electrode 300 are disposed. Here, the reason for excluding the coating of the film 120 on the first electrode 200 and the second electrode 300 is to prevent interference of signal transmission from the first electrode 200 and the second electrode 300 due to the resistance of the film 120.

As illustrated in FIG. 3, the first electrode 200 and the second electrode 300 may be disposed to be spaced apart from each other in a direction perpendicular to one surface of the flexible substrate 100. In addition, as illustrated in FIG. 2, the first electrode 200 and the second electrode 300 may be disposed on one surface of the flexible substrate 100 so as to face each other when the flexible substrate 100 is folded.

The dielectric layer 400 may be interposed between the first electrode 200 and the second electrode 300. According to an exemplary embodiment, the dielectric layer 400 may be made of a soft substrate containing a dielectric material to increase sensitivity of the pressure sensor by maximizing deformation caused by external pressure.

The signal processing unit 500 may be disposed on one surface of the flexible substrate 100 as illustrated in FIG. 3. That is, the signal processing unit 500 may be disposed on the same surface of the flexible substrate 100 as the surface on which the first electrode 200 and the second electrode 300 are disposed. In addition, when external pressure is applied to the flexible substrate 100 in a state in which the flexible substrate wo is folded, the signal processing unit 500 may convert a capacitance, which changes as a thickness of the dielectric layer 400 interposed between the first electrode 200 and the second electrode 300 by the corresponding pressure, into an electrical signal, and may transmit the converted electrical signal to a communication unit 600 to be described later. According to an exemplary embodiment, the signal processing unit 500 in the present disclosure may be a capacitor digital converter (CDC).

As illustrated in FIG. 3, the communication unit 600 may be disposed on one surface of the flexible substrate 100 and electrically connected to the signal processing unit 500 to transmit the electrical signal converted by the signal processing unit 500 to an external device (not illustrated). According to an exemplary embodiment, the external device (not illustrated) may be a robot including a controller capable of receiving a signal sensed from the capacitive pressure sensor according to the present disclosure and performing a specific control based on sensed information.

A stainless steel substrate 700 may be disposed on the bottom surface of the flexible substrate 100 on which the signal processing unit 500 is disposed. As such, by attaching the stainless steel substrate 700 onto the bottom surface of the flexible substrate 100 on which the signal processing unit 500 is disposed and supporting the corresponding portion, a portion of the flexible substrate 100 on which the signal processing unit 500 is disposed may be prevented from bending, and safety of the signal processing unit 500 may be improved.

Based on the configuration described above, an operation of the capacitive pressure sensor according to an exemplary embodiment of the present disclosure will be described. When an external force is applied to the first electrode 200 or the second electrode 300 in a state in which the flexible substrate 100 is folded, the thickness of the dielectric layer 400 interposed between the first electrode 200 and the second electrode 30o may change, the capacitance of the pressure sensor may changes as the thickness of the dielectric layer 400 change, and an analog signal of the amount of change in capacitance may be transmitted to the signal processing unit 500. The signal processing unit 500 receiving the analog signal of the amount of change in capacitance may convert the corresponding analog signal into a digital signal and transmit data corresponding to the amount of change in capacitance to the communication unit 600, and the communication unit 600 may transmit the data to the external device.

As described above, in the capacitive pressure sensor according to an exemplary embodiment of the present disclosure, the problems that the capacitive pressure sensor and the signal processing unit for processing the signal sensed by the capacitive pressure sensor were conventionally configured as the separate components, the capacitive pressure sensor and the signal processing unit which are heterogeneous thus had to be connected through the connector, and as a result, the problems such as the instability of the sensor signal and the data loss occur were solved by disposing the first electrode 200, the second electrode 300, and the signal processing unit 500 on the same surface of the flexible substrate 100 and forming the printed circuit pattern on the corresponding surface to electrically connect the respective component to each other, thereby integrating the capacitive pressure sensor and the signal processing unit of processing the signal sensed by the capacitive pressure sensor.

Further, the first electrode and the second electrode are disposed on the same surface of the flexible substrate and the flexible substrate is folded such that the first electrode and the second electrode face each other without an additional external structure, thereby making it possible to easily shape the capacitor.

Figure 6:
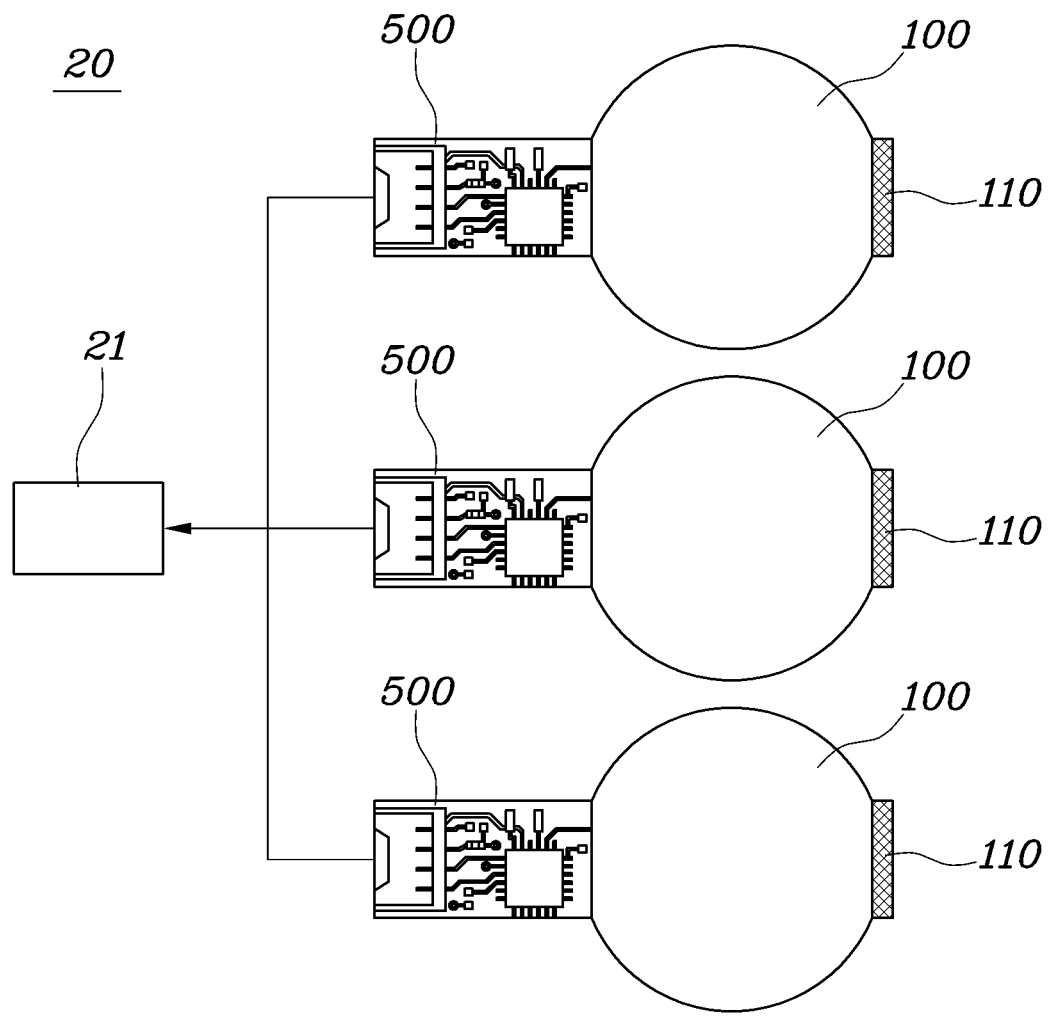
FIG. 6 is a view illustrating a capacitive pressure sensor device according to an exemplary embodiment of the present disclosure.

FIG. 6 is a view illustrating a capacitive pressure sensor device according to an exemplary embodiment of the present disclosure. As illustrated in FIG. 6, a capacitive pressure sensor device 20 according to an exemplary embodiment of the present disclosure may include a plurality of capacitive pressure sensors 10. In this case, the plurality of pressure sensors 10 may be connected in parallel to each other. Further, the capacitive pressure sensor device 20 according to an exemplary embodiment of the present disclosure may further include a signal integrating unit 21 for integrating signals transmitted from each signal processing unit of the plurality of capacitive pressure sensors 10 connected in parallel to each other.

In other words, the capacitive pressure sensor device 20 may integrate the respective pressure sensor signals transmitted from the plurality of capacitive pressure sensors 10 in the signal integrating unit 21, and transmit the integrated pressure sensor signal to an external device (not illustrated) or the like. According to an exemplary embodiment, the external device (not illustrated) may be a robot including a controller capable of receiving a signal sensed from the capacitive pressure sensor device according to the present disclosure and performing a specific control based on sensed information.

Figure 7:
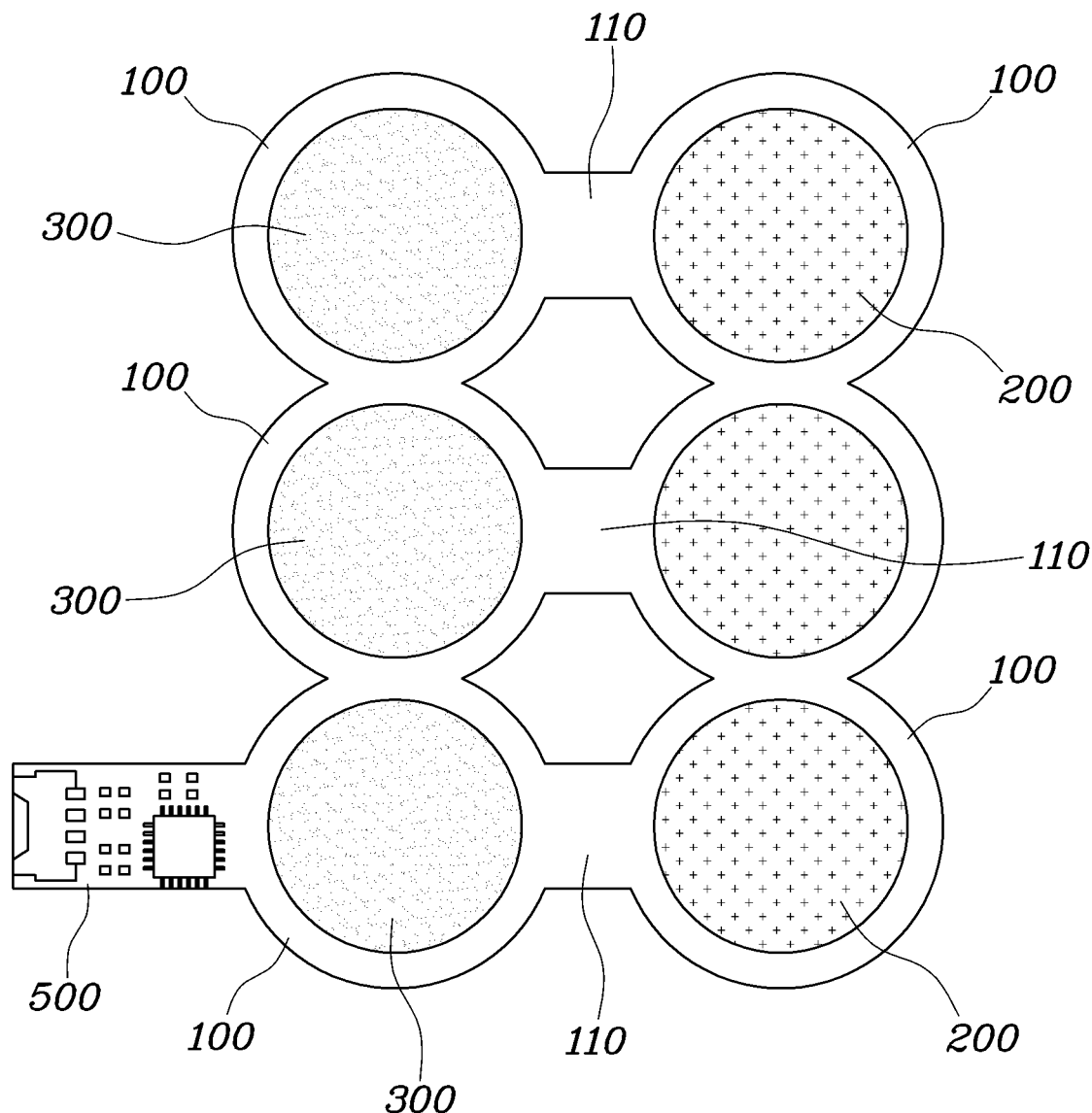
FIG. 7 is a view illustrating a capacitive pressure sensor device according to another exemplary embodiment of the present disclosure.

FIG. 7 is a view illustrating a capacitive pressure sensor device according to another exemplary embodiment of the present disclosure. As illustrated in FIG. 7, a capacitive pressure sensor device 20 according to another exemplary embodiment of the present disclosure may include a plurality of flexible substrates 100, a plurality of first electrodes 200 and second electrodes 300 disposed on one surface of each of the flexible substrates to be spaced apart from each other and located to face each other when the flexible substrates 100 are folded, dielectric layers 400 interposed between the first electrodes 200 and the second electrodes 300, and a signal processing unit 500 disposed on one surface of one of the plurality of flexible substrates 100 and converting a capacitance, which changes as a thickness of the dielectric layer changes by external pressure in a state in which the plurality of flexible substrates 100 are folded, into an electrical signal. In this case, the plurality of first electrodes 200 and second electrodes 300 may be connected in parallel to each other, and may be connected to the signal processing unit 500.

Figure 8:
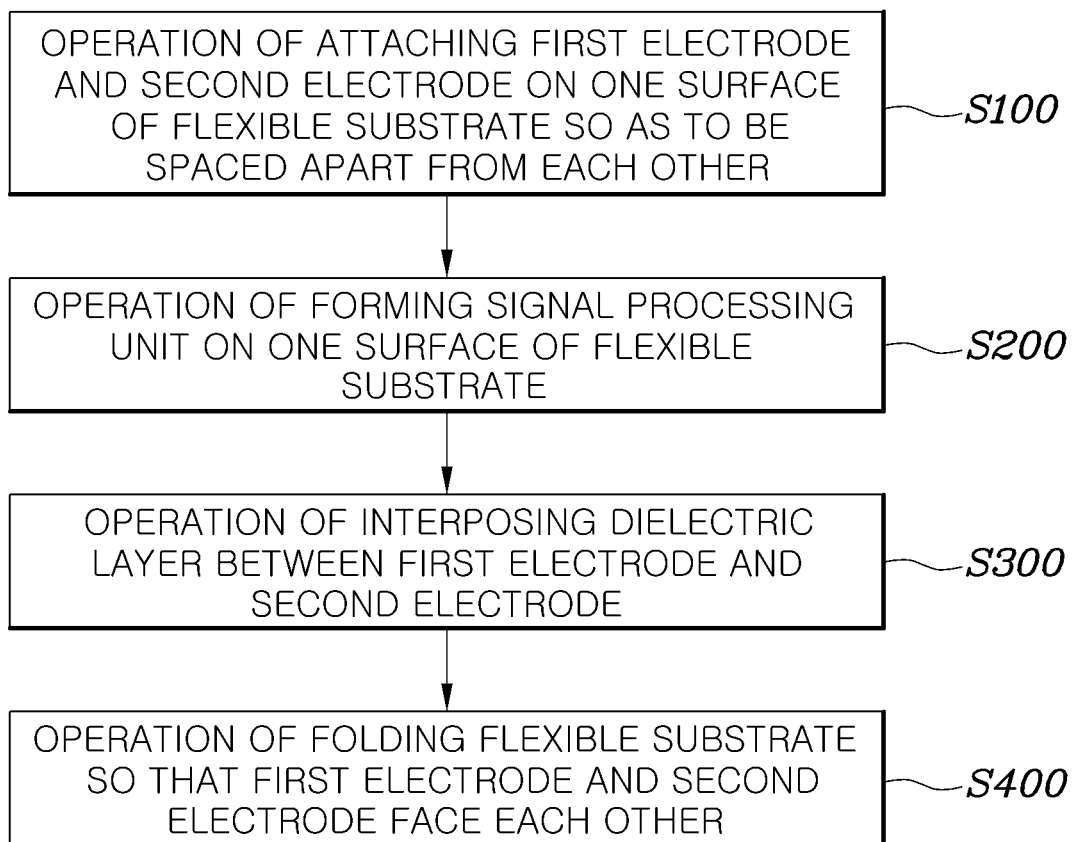
FIG. 8 is a view illustrating a flow of a manufacturing method of a capacitive pressure sensor according to an exemplary embodiment of the present disclosure.

FIG. 8 is a view illustrating a flow of a manufacturing method of a capacitive pressure sensor according to an exemplary embodiment of the present disclosure. As illustrated in FIG. 8, a manufacturing method of a capacitive pressure sensor according to an exemplary embodiment of the present disclosure may include an operation of attaching a first electrode and a second electrode onto one surface of a flexible substrate so as to be spaced apart from each other; an operation of forming a signal processing unit on one surface of the flexible substrate; an operation of interposing a dielectric layer between the first electrode and the second electrode; and an operating of folding the flexible substrate so that the first electrode and the second electrode face each other.

In addition, the manufacturing method may further include, before the operation of folding the flexible substrate so that the first electrode and the second electrode face each other, an operation of forming a communication unit electrically connected to the signal processing unit and transmitting a signal converted by the signal processing unit to an external device, on one surface of the flexible substrate.

Further, the manufacturing method may further include, before the operation of attaching the first electrode and the second electrode onto one surface of the flexible substrate so as to be spaced apart from each other, an operation of forming a pattern between the portions of the flexible substrate on which the first electrode and the second electrode are disposed; and an operation of attaching a stainless steel substrate on a bottom surface of the flexible substrate on which the signal processing unit is disposed.

Meanwhile, detailed technical features of each operation of the manufacturing method of the capacitive pressure sensor according to an exemplary embodiment of the present disclosure are the same as the technical features of the capacitive pressure sensor described above, and a detailed description thereof will thus be omitted.

In the capacitive pressure sensor according to an exemplary embodiment of the present disclosure, the problems that the capacitive pressure sensor and the signal processing unit for processing the signal sensed by the capacitive pressure sensor were conventionally configured as the separate components, the capacitive pressure sensor and the signal processing unit which are heterogeneous thus had to be connected through the connector, and as a result, the problems such as the instability of the sensor signal and the data loss occur may be solved by disposing the first electrode, the second electrode, and the signal processing unit on the same surface of the flexible substrate and forming the printed circuit pattern on the corresponding surface to electrically connect the respective component to each other, thereby integrating the capacitive pressure sensor and the signal processing unit of processing the signal sensed by the capacitive pressure sensor.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A method of operating a plurality of capacitive pressure sensors, each capacitive pressure sensor comprising a first electrode and a second electrode disposed on a surface of a folded flexible substrate, the first and second electrodes facing each other and being separated from each other by a dielectric layer, the method comprising:
   for each capacitive pressure sensor, generating an electrical signal related to a change in capacitance between the first and second electrodes, the change in capacitance resulting from a change in thickness of the dielectric layer due to an external pressure;
   transmitting the electrical signals from the capacitive pressure sensors to an external device; and
   integrating signals transmitted from each capacitive pressure sensor.

2. The method of claim 1, wherein each capacitive pressure sensor is connected with a respective signal processing unit that is attached to the flexible substrate and wherein, for each capacitive pressure sensor, the electrical signal is generated by the respective signal processing unit attached.

3. The method of claim 2, wherein each capacitive pressure sensor is connected with a respective communication unit that is attached to the flexible substrate and wherein, for each capacitive pressure sensor, the electrical signal is transmitted by the respective communication unit.

4. The method of claim 2, wherein the plurality of capacitive pressure sensors are connected in parallel to each other.

5. The method of claim 1, wherein the plurality of capacitive pressure sensors are connected in parallel to each other.

6. The method of claim 1, wherein, for each capacitive pressure sensor, a pattern is formed at a portion of the flexible substrate between the first electrode and the second electrode.

7. The method of claim 1, wherein each capacitive pressure sensor includes a signal processing unit disposed on one surface of the flexible substrate.

8. The method of claim 7, wherein the capacitive pressure sensor further includes a stainless steel substrate attached to a bottom surface of the flexible substrate on which the signal processing unit is disposed.

9. The method of claim 7, wherein each capacitive pressure sensor includes a communication unit disposed on one surface of the flexible substrate and electrically connected to the signal processing unit.

10. The method of claim 1, wherein, for each capacitive pressure sensor, the flexible substrate is coated with a film except for portions on which the first electrode and the second electrode are disposed.

11. A method of operating a plurality of capacitive pressure sensors, each capacitive pressure sensor comprising a first electrode and a second electrode disposed on a surface of a folded flexible substrate, the first and second electrodes facing each other and being separated from each other by a dielectric layer, the method comprising:
   experiencing an external pressure that causes a thickness of the dielectric layer of each capacitive pressure sensor to change;
   for each capacitive pressure sensor, determining a change in capacitance resulting from the change in thickness;
   for each capacitive pressure sensor, generating an electrical signal related to the change in capacitance;
   transmitting the electrical signals from the capacitive pressure sensors to an external device; and
   integrating signals transmitted from each capacitive pressure sensor.

12. The method of claim 11, wherein each capacitive pressure sensor is connected with a respective signal processing unit that is attached to the flexible substrate and wherein, for each capacitive pressure sensor, the electrical signal is generated by the respective signal processing unit attached.

13. The method of claim 12, wherein each capacitive pressure sensor is connected with a respective communication unit that is attached to the flexible substrate and wherein, for each capacitive pressure sensor, the electrical signal is transmitted by the respective communication unit.

14. The method of claim 12, wherein the plurality of capacitive pressure sensors are connected in parallel to each other.

15. The method of claim 11, wherein the plurality of capacitive pressure sensors are connected in parallel to each other.

16. A method of operating a plurality of capacitive pressure sensors, each capacitive pressure sensor comprising a first electrode and a second electrode disposed on a surface of a folded flexible substrate, the method comprising:
   folding the flexible substrate so that the first and second electrodes face each other and are separated from each other by a dielectric layer;

generating an electrical signal related to a change in capacitance between the first and second electrodes, the change in capacitance resulting from a change in thickness of the dielectric layer due to an external pressure; and transmitting the electrical signal from the capacitive pressure sensor to an external device.

17. The method of claim 16, wherein each capacitive pressure sensor is connected with a respective signal processing unit that is attached to the flexible substrate and wherein, for each capacitive pressure sensor, the electrical signal is generated by the respective signal processing unit attached.

18. The method of claim 17, wherein each capacitive pressure sensor is connected with a respective communication unit that is attached to the flexible substrate and wherein, for each capacitive pressure sensor, the electrical signal is transmitted by the respective communication unit.

19. The method of claim 17, wherein the plurality of capacitive pressure sensors are connected in parallel to each other.

20. The method of claim 16, wherein the plurality of capacitive pressure sensors are connected in parallel to each other.

* * * * *